United States Patent [19]

Sallavanti et al.

[11] Patent Number: 4,846,408
[45] Date of Patent: Jul. 11, 1989

[54] METHOD FOR MAKING A FRICTION MATERIAL

[75] Inventors: Robert A. Sallavanti, Dalton; Matthew P. Curtis, Waymart, both of Pa.

[73] Assignee: Gentex Corporation, Carbondale, Pa.

[21] Appl. No.: 146,479

[22] Filed: Jan. 21, 1988

[51] Int. Cl.⁴ .............................................. B02C 19/12
[52] U.S. Cl. ........................................ 241/18; 241/23; 241/DIG. 37; 523/156; 523/157
[58] Field of Search ................ 241/23, DIG. 37, 65, 241/26, 30, 33, 17, 18; 523/156, 157

[56] References Cited

U.S. PATENT DOCUMENTS

| | | | |
|---|---|---|---|
| 2,347,464 | 4/1944 | Cuno | 260/758 |
| 2,609,150 | 9/1952 | Bludeau | 241/15 |
| 2,665,850 | 1/1954 | Wiczer | 241/23 |
| 2,879,005 | 3/1959 | Jarvis | 241/14 |
| 3,527,414 | 9/1970 | Schorsch | 241/23 |
| 3,658,259 | 4/1972 | Ledergerber | 241/5 |
| 3,734,412 | 5/1973 | Haas et al. | 241/15 |
| 3,771,729 | 11/1973 | Frable | 241/65 |
| 3,774,855 | 11/1973 | Wolf | 241/65 |
| 3,818,976 | 6/1974 | Ledergerber | 165/1 |
| 3,921,917 | 11/1975 | Meinass | 241/17 |
| 4,020,992 | 5/1977 | Binger et al. | 241/18 |
| 4,102,503 | 7/1978 | Meinass | 241/18 |
| 4,219,452 | 8/1980 | Littlefield | 260/3 |
| 4,340,076 | 7/1982 | Weitzen | 241/23 X |
| 4,374,211 | 2/1983 | Gallagher et al. | 523/156 |
| 4,483,488 | 11/1984 | Luff et al. | 241/23 |

FOREIGN PATENT DOCUMENTS 772918 3/1972 Belgium .
2359118 7/1974 Fed. Rep. of Germany .
1534274 11/1978 United Kingdom .

OTHER PUBLICATIONS

Loken, "Asestos Free Brakes and Dry Clutches Reinforced with Kevlar Aramid Fiber", (1981).
Munson Machinery Company, Inc., "Munson SCC Rotary Cutter", (undated brochure).

Primary Examiner—Mark Rosenbaum
Attorney, Agent, or Firm—Shenier & O'Connor

[57] ABSTRACT

Pieces of aramid cloth impregnated with a blend of phenolic and polyvinyl butyral resins are cryogenically chilled to the point of embrittlement in a liquid nitrogen bath and then fed to a rotary impact mill to comminute the pieces into a fibrous material suitable for use in brake linings or other friction applications. The rotary impact mill is chilled by cold gaseous nitrogen from the liquid nitrogen bath, the flow of which is controlled in response to a thermocouple disposed near the mill exit.

15 Claims, 1 Drawing Sheet

METHOD FOR MAKING A FRICTION MATERIAL

FIELD OF THE INVENTION

Our invention relates to a novel friction material for use in the manufacture of friction products such as automotive disk and drum brakes, clutches and gaskets, as well as to a method and apparatus for making the friction material.

DESCRIPTION OF THE PRIOR ART

Various efforts have recently been made to find a suitable replacement for asbestos, a carcinogen, in friction materials for use in brake linings and the like. Some of those efforts involve the use of aromatic polyamide, or "aramid", fibers, in either cut or pulp form, together with such ingredients as phenolic resin. Gallagher et al U.S. Pat. No. 4,374,211 and Loken, "Asbestos Free Brakes and Dry Clutches Reinforced with Kevlar Aramid Fiber" (SAE 1981), describe the use of such aramid-based friction materials. Although the formulations described in those references are satisfactory in many respects, they also have drawbacks, including relatively high cost and poor dispersibility.

SUMMARY OF THE INVENTION

One of the objects of our invention is to provide a noncarcinogenic substitute for asbestos-based friction materials.

Another object of our invention is to provide a friction material that is readily dispersible.

Another object of our invention is to provide a friction material that is simple and inexpensive to manufacture.

Other and further objects will be apparent from the following description.

In general, our invention contemplates a method of making friction material in which aramid yarn impregnated with resin is first cryogenically chilled to the point of embrittlement and then comminuted to produce a friction material comprising aramid fibers and adhering resin. Preferably, the aramid yarn is in the form of a woven fabric, and is derived from uncured or partially cured scraps from the fabrication of protective helmets from laminates of resin-impregnated cloth. The cryogenic chilling is preferably performed by immersion in a cryogenic liquid such as liquid nitrogen at −320° F. Preferably the comminution step is performed in a rotary impact mill which is supplied with a cold gas such as nitrogen to maintain the milling temperature below 75° F. The resulting fibrous product may, if desired, be compacted using a baler or the like to facilitate subsequent handling or shipment.

Our fabrication method is exceedingly simple, since it essentially involves only two steps—chilling and grinding. The raw materials, furthermore, are quite inexpensive, since they are scraps from another fabrication process that would otherwise be discarded. The only other material cost is that of liquid nitrogen, which is commonly available and inexpensive. Not only is the manufacturing process advantageous, but the material itself, because of the grinding procedure used, exhibits remarkable characteristics which cannot be realized with aramid products of the prior art.

BRIEF DESCRIPTION OF THE DRAWINGS

In the accompanying drawings to which reference is made in the instant specification and which are to be read in conjunction therewith and in which like reference characters are used to indicate like parts in the various views.

DESCRIPTION OF THE PREFERRED EMBODIMENT

Figure 1:
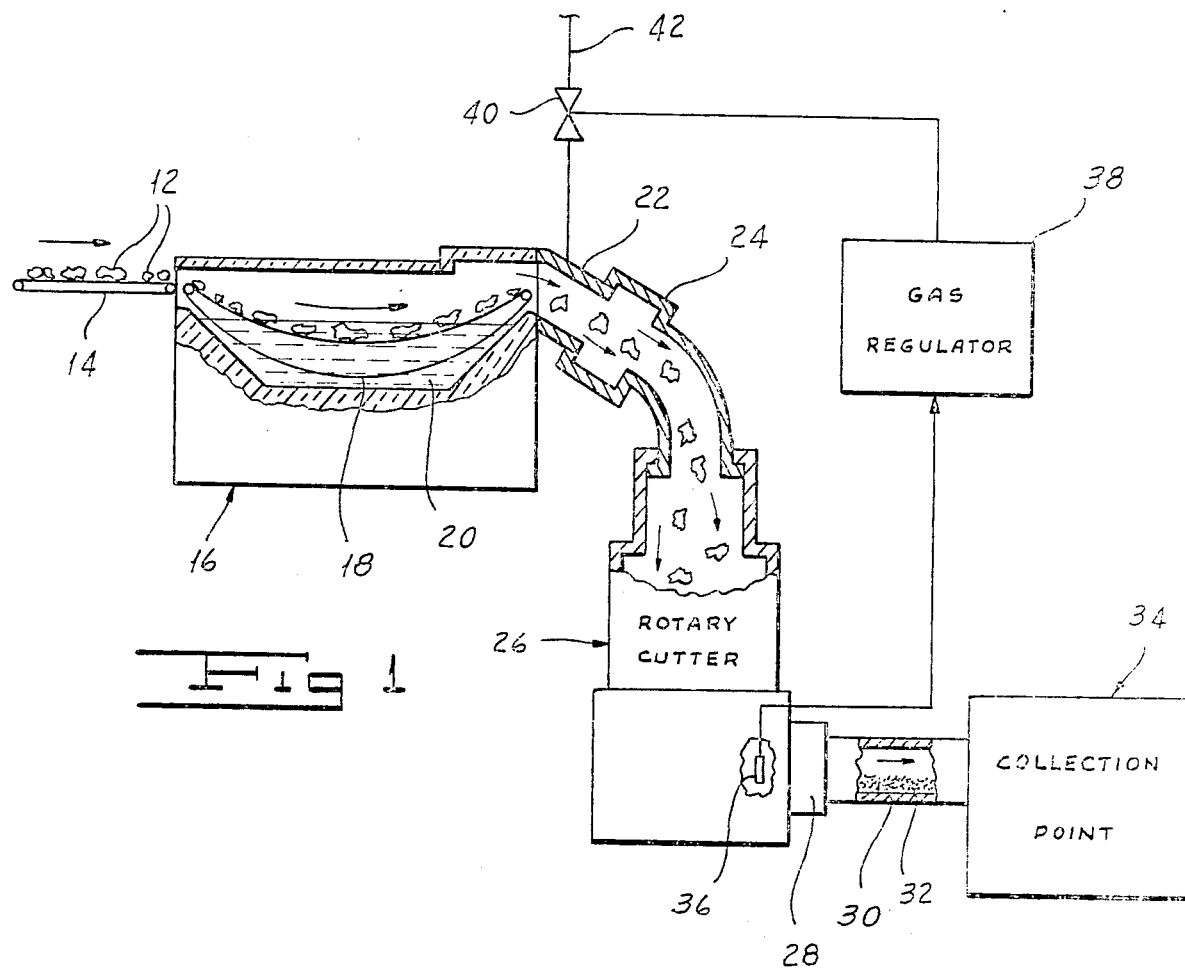
FIG. 1 is a partly schematic view of a system that may be used to practice our invention.
Figure 2:
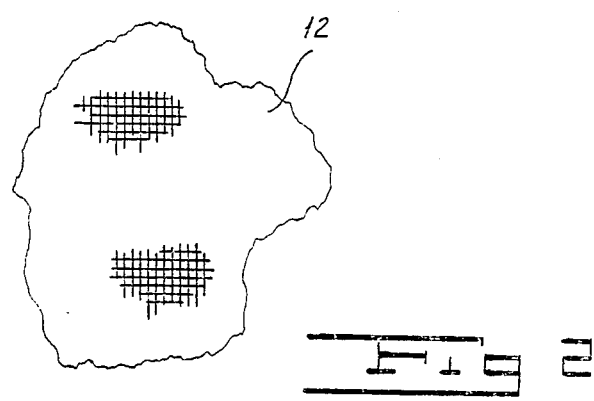
FIG. 2 is an enlarged fragmentary view of the resin-impregnated cloth used as the starting material in the system shown in FIG. 1.

FIG. 1 schematically shows a system, indicated generally by the reference numeral 10, for practicing our invention. In the system 10, scraps 12 of aramid yarn material, preferably pieces of fabric that have been impregnated with a resin, are supplied to a conveyor belt 14 which carries the material to the entrance of an immersion freezer, indicated generally by the reference numeral 16, such as the one made by Koach Engineering. If desired, conveyor belt 14 may be omitted and the material 12 fed to the freezer manually. A second conveyor belt 18 carries the material 12 supplied to the entrance of freezer 16 through a liquid nitrogen bath 20 having an equilibrium temperature of −320° F. Conveyor belts 14 and 18 are operated at such speeds as to allow the immersed material 12 to reach cryogenic equilibrium with the liquid nitrogen in the bath 20. Such equilibrium is reached when the bath 20 stops effervescing.

The yarn is preferably the aramid cloth specified in Military Specification MIL-C-44050 (amended Sept. 24, 1982), the disclosure of which is incorporated herein by reference. As described in said specification for cloth of Type II, Class 1, the cloth is made from virgin aramid fiber, preferably that manufactured by E. I. du Pont de Nemours and Company under the trademark KEVLAR 29. The warp and filling yarns of the cloth are continuous-filament 1500 denier, with a minimum fiber tenacity of 20 grams per denier and a minimum of 1.5 warp turns per inch. The preferred cloth has a weight of between 13.7 and 14.7 ounces per square yard, 35 warp yarns per inch and 39 filling yarns per inch, the weave being a two-by-two basket.

The resin is preferably that specified in Military Specification MIL-H-44099A (Dec. 22, 1986), the disclosure of which is incorporated herein by reference. As disclosed in said specification, the resin is a catalyzed system composed of 50 percent phenol formaldehyde and 50 percent polyvinyl butyral resins, a particular formulation being as follows:

| Component | Parts by Weight | % of Total Solids |
| --- | --- | --- |
| Polyvinyl butyral (18–20% hydroxyl) | 868 (25% solids in ethanol) | 47.2 |
| Phenol formaldehyde | 100 (57% solids in ethanol) | 12.4 |
| Trimethylol phenol | 267 (60% solids in ethanol) | 34.8 |
| Phthalic anhydride | 25.6 | 5.6 |
| Methanol | 51.2 | |
| Total | 1311.8 | 100.0 |

The aramid cloth is coated on both sides with equal amounts of the laminating resin. The resin content of the coated cloth is 15% to 18% solids by weight (volatile free), based on the uncoated material weight, and the mix reduced to spraying consistency. Other resins such as epoxy resins and cross-linked polyesters may be used instead of the resin described above. Preferably the resin selected is present in an amount not exceeding about 20% of the weight of the yarn.

Preferably, from the standpoint of economy, the raw material 12 consists of at least partially uncured scraps from the manufacture of helmet shells from laminates of resin-impregnated cloth. As described in MIL-H-44099A, referred to above, a plurality of superimposed layers of the impregnated cloth are placed between the two halves of a compression mold, and then compression-molded while applying heat to form the shell. Scraps from such manufacturing process typically consist of "table cuttings", or uncured pieces of impregnated cloth removed before placement in the mold, and "pinchoff", or partially cured portions removed from the periphery after the curing of the central portion.

Belt 18 carries material 12 upwardly out of the bath 20 to the exit of the freezer 16, where the material travels through an exit chute 22 into the throat 24 of a high-speed rotary impact mill or cutter indicated generally by the reference character 26. A suitable such cutter 26, used in the system 10, is the Munson SCC-30 rotary cutter, available from Munson Machinery Company, Inc. of Utica, New York. Cutter 26 is fitted with a ⅜-inch screen (not shown) so that the fibrous material 32 issuing from exit point 28 has an average length of 1 inch. Cutter 26 has blades (not shown) that are fixed relative to the mill rotor. However, other types of mills, including hammer mills in which the impact elements are movable relative to the mill rotor, may also be used. The term "rotary impact mill", as used herein, thus includes mills in which the impact elements move relative to a mill rotor as well as mills in which the impact elements are fixed relative thereto.

The material 32 is removed from cutter 26 and conveyed through a duct 30 to a collection point 34, preferably pneumatically by means of a partial vacuum at the downstream end of duct 30. There the material 32 is compressed and wrapped into a bale for shipment to customers. A suitable baler is the Model 36 manufactured by Accurate Industries, of Williamstown, N.J. If desired, however, duct 30 and collection point 34 may be omitted and the material 32 simply collected as it passes through the screen of cutter 26.

The liquid nitrogen in the bath 20 lowers the temperature of the resin in the material 12 to a point where it can be easily fractured, since the bath temperature of $-320°$ F. is well below the glass-transition temperature of the polymers. Lowering the temperature of the material 12 also prevents thermal degradation of the resin and aramid constituents and eliminates the explosion hazards that can result from heat buildup.

Since the liquid nitrogen bath 20 of the immersion freezer 16 is enclosed from above, much of the evaporating nitrogen from the bath will enter the interior of cutter 26 through exit chute 22 and throat 24. The rotating portions of mill 26 enhance this flow by creating a partial vacuum drawing the gaseous nitrogen into the mill. This use of cold gaseous nitrogen is an important aspect of the process, since the gaseous nitrogen that is supplied to the cutter 26 reduces the milling temperature to a level assuring adequate product consistency, mill and screen longevity and processing efficiency.

A thermocouple 36 is used to monitor the temperature at the exit from cutter 26. Thermocouple 36 controls a gas regulator 38, which in turn regulates a valve 40 in a conduit 42 coupled to the exit duct 22. Conduit 42 may simply be a flue for diverting gaseous nitrogen from throat 24 or, if desired, may be a line coupled to a separate supply (not shown) of cold gaseous nitrogen. Valve 40 is regulated in such a manner as to maintain the exit temperature in cutter 26 below 75° F.

With a ⅜-inch sieve, the fibrous end product 32 has an average fiber length of one inch. An analysis of the distribution of fiber lengths appears in the following table:

| Wet Sieve | Amount |
|---|---|
| BSS[1]  7 | 68.50% |
| BSS[1]  14 | 2.60 |
| BSS[1]  25 | 2.65 |
| BSS[1]  50 | 14.50 |
| USS[2] 200 | 7.25 |
| USS[2] 200 | 4.50 |
| Total | 100.00% |

[1]British Standard Sieve
[2]United States Standard Sieve

The resulting product 32 may be used in the manufacture of friction products such as automotive disk and drum brakes, clutches and gaskets in a manner known to the art as exemplified by the above-identified Gallagher et al patent and Loken article and the references cited therein.

It will be seen that we have accomplished the objects of our invention. Our friction material is noncarcinogenic, is readily dispersible and is simple and inexpensive to manufacture. It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. A method of making a friction material including the steps of chilling an aramid yarn impregnated with a resin and comminuting said chilled yarn to produce said material.

2. A method as in claim 1 in which said resin is a thermosetting resin.

3. A method as in claim 1 in which said resin is a blend of phenolic resin and polyvinyl butyral resin.

4. A method as in claim 1 in which said resin is a blend of phenolic resin and polyvinyl butyral resin in substantially equal amounts by weight.

5. A method as in claim 1 in which said resin is present in an amount not exceeding about 20% of the weight of said yarn.

6. A method as in claim 1 in which said yarn is a continuous-filament yarn.

7. A method as in claim 1 in which said yarn is woven into a fabric before being chilled.

8. A method as in claim 1 in which said chilling step comprises the step of immersing said yarn in a cryogenic liquid.

9. A method as in claim 1 in which said chilling step comprises the step of immersing said yarn in liquid nitrogen.

10. A method as in claim 1 in which said chilling step comprises the step of chilling said yarn to a temperature of about −320° F.

11. A method as in claim 1 in which said comminuting step is performed using a rotary impact mill.

12. A method as in claim 1 in which said comminuting step is performed while continuing to chill said yarn.

13. A method as in claim 1 in which said comminuting step is performed while continuing to chill said yarn with cold gas.

14. The product of the method of any one of claims 1 to 13.

15. A method of making a friction material including the steps of immersing an aramid yarn impregnated with a resin in a cryogenic liquid to chill said yarn and comminuting said chilled yarn in an impact mill while continuing to chill said yarn with cold gas to produce said material.

* * * * *